Patented Aug. 28, 1951

2,565,487

UNITED STATES PATENT OFFICE 2,565,487

PRODUCTION OF ESTERS

Edward M. Filachione, Philadelphia, and Charles H. Fisher, Abington, Pa., assignors to the United States of America as represented by the Secretary of Agriculture No Drawing. Application December 27, 1948, Serial No. 67,556

6 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This invention relates to the production of esters and has among its objects a process in which a basic nitrogen salt of an organic carboxylic acid, in which the nitrogen of the salt group has a valence of 5, is converted directly into an ester of the organic acid, and such other objects as will be apparent from the following description and claims.

In general, according to the invention, the esterification is effected by reacting the basic nitrogen salt of the organic carboxylic acid with an alcohol. In the reaction the salt group is replaced with the alcohol group to produce the ester. The reaction is according to the following general equation:

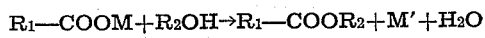

$$R_1\text{—COOM} + R_2\text{OH} \rightarrow R_1\text{—COOR}_2 + M' + H_2O$$

wherein $R_1$ and $R_2$ are organic groups, M is a basic nitrogen group in which the N has a valence of 5 and M' is a nitrogen compound corresponding to the M but in which the N has a valence of 3. The esterification is more particularly illustrated for example by the equation:

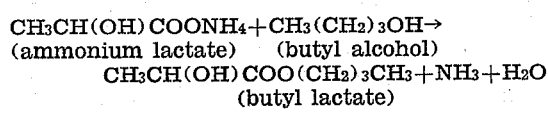

$$\text{CH}_3\text{CH(OH)COONH}_4 + \text{CH}_3(\text{CH}_2)_3\text{OH} \rightarrow$$
(ammonium lactate)     (butyl alcohol)
$$\text{CH}_3\text{CH(OH)COO(CH}_2)_3\text{CH}_3 + \text{NH}_3 + \text{H}_2\text{O}$$
(butyl lactate)

The reaction is conducted at reaction temperatures, in the presence or absence of a catalyst, suitable catalysts for the purpose being ammonium sulfate, ammonium chloride and in general ammonium or amine salts of inorganic and sulfonic acids or acidic salts formed by neutralizing a strong acid with a weak base, for example, zinc chloride, ammonium toluene-sulfonate, aniline hydrochloride, and aluminum sulfate.

Either anhydrous conditions or an aqueous solution of the reactants may be employed. The process may be conducted under any desired pressure conditions and is facilitated by continuously removing formed water and $\text{NH}_3$ (in case the nitrogen salt of the organic carboxylic acid is an ammonium salt) from the reactants. This is conveniently accomplished by vaporizing the water and azeotropically distilling it along with a suitable added entraining agent such as an organic solvent capable of forming a water-containing azeotrope. Preferably, however, an excess of the reacting alcohol is used which acts also as the entraining agent. The $\text{NH}_3$ is removed with the water as $\text{NH}_4\text{OH}$ or as a gas.

The present process makes possible the direct conversion of a basic nitrogen salt of an organic acid to an ester of the corresponding organic acid. This affords a saving in chemicals and is superior to previously utilized methods in certain cases where the acid is obtained in form of certain of its salts, since it obviates the necessity of producing the free organic acid from the salt of the acid by interaction with a mineral acid, prior to subjecting the organic acid to esterification. Thus, for example, in the manufacture of esters of lactic acid, as practiced heretofore, the lactic acid fermentation was conducted in the presence of lime or calcium carbonate for neutralization purposes, giving a liquor containing calcium lactate, and this required subsequent production of lactic acid from the calcium lactate with sulfuric acid prior to esterification—a process which involves a costly filtration step to remove the formed calcium sulfate. By using the method of this invention, lactic acid may be neutralized during the fermentation with ammonia. The ammonium lactate thus obtained is then directly converted to the ester of lactic acid according to the above-described process, and the ammonia liberated in the esterification reaction is recycled for neutralizing the lactic acid. An added advantage is that the corrosive action on equipment of many organic acids, such as acetic and lactic, is minimized, since they are not present in their free state.

The basic nitrogen salt group of the salt of the organic acid may be one which in the reaction frees ammonia, a primary amine, a secondary amine, a tertiary amine, or a heterocyclic basic nitrogen compound like pyridine, among which may be mentioned mono- and dimethylamine, mono- and diethylamine, methylethylamine, isopropylamine, trimethylamine, triethylamine, tributylamine, dibutylamine, diamylamine, triamylamine, trioctylamine, benzyldimethylamine, dicyclohexylamine, aniline, methylaniline, dimethylaniline, and toluidine. Usually it is advantageous to employ a salt of an organic acid corresponding to the formula:

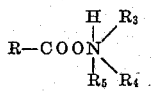

where $R_3$, $R_4$ and $R_5$ are the same or different organic radicals such as alkyls like methyl, ethyl, butyl, and higher alkyls, cycloalkyls like cyclohexyl, and aryl radicals like phenyl, tolyl, benzyl and naphthyl and where also any or all of $R_3$, $R_4$ and $R_5$ may each represent a hydrogen atom.

The carboxylic acid radical of the basic nitrogen salt of the organic carboxylic acid may be one corresponding to that of aliphatic acids, such as formic, acetic, chloroacetic, propionic, butyric, isobutyric, caproic, isovaleric, lauric, palmitic, stearic, 2-ethylhexanoic, acrylic, crotonic, oleic, linoleic and linolenic acid; hydroxy acids, such as glycolic, lactic, hydracrylic, hydroxybutyric, hydroxyisobutyric, γ-hydroxyvaleric, gluconic, hydroxystearic and ricinoleic acid; amino-acids such as glycine, alanine, valine, leucine, ε-aminocaproic acid, and other amino acids which may have the amino group linked to the alpha, beta or other carbon atoms, and their acyl derivatives such as acetyl glycine, formyl leucine, N-carbomethoxy alanine; ether-acids such as methoxyacetic, 2-ethoxypropionic, 3-propoxypropionic, 4-propoxyvaleric, furoic, 2-ethoxyisovaleric, and 5-butoxylauric acid; acyloxy acids such as propionoxy acetic, alpha-acetoxypropionic, beta-propionoxypropionic, gamma-acetoxy caproic, and alpha-benzoyloxypropionic acid; levulinic acid; polylactic acid; acylated polylactic acids, such as $CH_3COOCH(CH_3)COOCH(CH_3)COOH$, and so forth; aromatic acids such as benzoic, chlorobenzoic, toluic, salicylic, aminobenzoic, phenylacetic, cinnamic acid, mandelic, and benzilic acid; and dibasic and polybasic acids such as phthalic, terephthalic, maleic, fumaric, citric, tartaric, itaconic, aconitic, oxalic, succinic, adipic, sebacic, diglycolic, and ethylene bis(glycolic acid).

Various primary, secondary or tertiary alcohols may be used to react with the basic nitrogen salt of the organic carboxylic acid. Suitable alcohols include methyl, ethyl, n-propyl, isopropyl, n-butyl, secondary butyl, isobutyl, tertiary butyl, tertiary amyl, n-amyl, isoamyl, capryl, dodecyl, 2-ethylhexyl, n-hexyl, cyclohexyl, furfuryl, tetrahydrofurfuryl, n-octyl, nonyl, 2-methylbutyl, 2-ethylbutyl, cetyl, crotyl, methallyl, allyl, benzyl, p-chlorobenzyl, cyanoethyl, and dimethylaminoethyl alcohols; 2-pentanol, 3-pentanol, 2-methyl-1-pentanol, 2,4-dimethyl-1-pentanol, 4-methyl-1-hexanol, heptanol, methyl isobutyl carbinol, diisopropyl carbinol, and diisobutyl carbinol. The alcohol also may be a polyhydric alcohol such as ethylene, diethylene and triethylene glycol; propylene and dipropylene glycol; polyalkylene glycols; 1,3-propanediol; butanediols (-1,3; -1,4 or -2,3); 1,5-pentanediol; 2-methyl-1,3-pentanediol; 2-ethyl-1,3-hexanediol; decanediols (-1, 10 or -1,2), dodecanediol-3,6; glycerol, diglycerol, erythritol, xylitol, mannitol, sorbitol, glucose, and pentaerythritol. Ether-alcohols may also be used, for instance, the alkyl and aryl monoethers of ethylene and diethylene glycol, such as the methyl, ethyl, propyl, butyl, hexyl, 2-ethylhexyl, phenyl, butylphenyl, octylphenyl, and benzyl monoethers of ethylene glycol and diethylene glycol.

The invention is exhibited in greater detail by the following examples:

*Example 1*

170 g. of an aqueous solution containing 107 g. (1 mole) ammonium lactate was mixed with 185 g. (2.5 moles) of n-butyl alcohol and 13.2 g. (0.1 mole) ammonium sulfate. The mixture was refluxed in a flask attached to a column, the upper end of which was fitted to a Barrett modified Dean and Stark moisture trap. Water distilled azeotropically with the alcohol, the moisture trap permitting automatic separation of the water and return of the alcohol to the reaction mixture. The ammonia that was formed in the reaction was in part collected in the water, and the remainder of the ammonia which escaped condensation was led from the condenser into an absorption attachment containing an aqueous solution of lactic acid. After 10½ hours of refluxing, the temperature of the reaction mixture rose from an initial 101° C. to 134° C., and that of the vapor from 89° to 115° C. During this period 95 g. of aqueous solution was collected, and the amount of ammonia liberated from the reaction mixture was 0.8 mole. The contents of the flask were then washed with water and the organic layer distilled under reduced pressures to isolate the butyl lactate, 95 g. of which was collected at 87°-93° C./21 mm.

*Example 2*

The procedure of Example 1 was repeated, omitting the ammonium sulfate. The reaction was completed within approximately 11 hours. About 60 percent of the ammonia was liberated from the reaction mixture, and 49 percent of the theoretical amount of butyl lactate was obtained.

*Example 3*

An aqueous solution of ammonium lactate (concentration approximately 60 percent) containing 1 mole of the ammonium salt of lactic acid, 2.5 moles of n-octanol and 0.1 mole of ammonium sulfate were reacted as described in Example 1. The reaction was completed after 2 hours of refluxing, and 121 g. of n-octyl lactate was recovered from the reaction mixture.

Esters of lactic acid were also prepared essentially according to the procedures described in the foregoing examples by slowly heating 1 mole of ammonium lactate in aqueous solution of approximately 60 percent concentration with varying amounts of different alcohols with or without catalysts. In each instance the temperature of the reaction mixture was maintained at a level sufficiently high to cause vaporization of the water. The reaction was considered completed, when on further increase of the temperature substantially no more aqueous condensate was obtained. The experimental data pertaining to some of these reactions are shown in the following table:

atmospheric pressure, in a Vigreux still. The temperature of the reaction mixture increased

*Table*

| Example No. | Alcohol | Quantity (moles) | Catalyst $(NH_4)_2SO_4$ (moles) | Temperature, °C. | | | | Reaction Time, Hours | B. P. ester | | Yield | | |
|---|---|---|---|---|---|---|---|---|---|---|---|---|---|
| | | | | Reaction mixture | | Vapor | | | | | | | |
| | | | | Initial | Final | Initial | Final | | °C. | Mm. | Ester | $H_2O$ | $NH_3$ |
| 4 | n-Butyl | 2.5 | 0.1 | 101 | 134 | 89 | 115 | 9.5 | 87–93 | 21 | 65 | 99 | 80 |
| 5 | do | 2.5 | None | 100 | 135 | 89 | 115 | 11 | 91–95 | 30 | 49 | 90 | 60 |
| 6 | do | 5 | 0.1 | 102 | 121 | 90 | 111 | 8 | 94–100 | 35 | 27 | 97 | 69 |
| 7 | iso-Butyl | 2.5 | 0.05 | 96 | 118 | 85 | 96 | 4.5 | 89–91 | 28 | 17 | 95 | 52 |
| 8 | Methallyl | 2.5 | 0.1 | 99 | 125 | 89 | 100 | 17 | 88–93 | 20 | 40 | 107 | 65 |
| 9 | Methyl iso-butyl carbinol | 2.5 | None | 110 | 145 | 91 | 128 | 7.5 | 44 | 0.4 | 22 | 106 | 70 |
| 10 | do | 2.5 | 0.05 | 110 | 143 | 90 | 127 | 7 | 46 | 0.7 | 17 | 103 | 69 |
| 11 | 2-ethyl butyl | 2.5 | 0.1 | 111 | 158 | 93 | 140 | 2 | 96–100 | 10 | 53 | 96 | 63 |
| 12 | n-Octyl | 2.5 | 0.1 | 114 | 195 | 94 | 87 | 2 | 98–103 | 1.3 | 60 | 98 | 87 |
| 13 | do | 2.5 | None | 118 | 147 | 98 | 92 | 3 | 86 | 0.65 | 60 | 90 | 82 |

*Example 14*

A mixture of 170 g. of approximately 60 percent aqueous ammonium lactate containing 1 mole of the lactate, 270 g. (2.5 moles) of benzyl alcohol and 6.6 g. (0.05 mole) ammonium sulfate was placed in a flask attached to a Vigreux column and heated under a vacuum of 54 mm. mercury to remove water by distillation. The temperature of the reaction mixture was gradually raised from 58° to 110° C. in 2½ hours, and 80 c. c. water was collected as distillate. The reaction mixture was then washed with water and distilled in vacuum. Benzyl lactate was collected at 79°–84° C./0.2 mm.

*Example 15*

A mixture of 170 g. of approximately 60 percent aqueous ammonium lactate, 370 g. (5 moles) n-butyl alcohol and 26.4 g. (0.2 mole) ammonium sulfate was reacted as described in Example 1. After 4½ hours the temperature of the reaction mixture rose from 100° to 125° C. and that of the vapors from 88° to 110° C., and 0.79 mole of ammonia as well as 104 cc. of aqueous distillate were collected. The n-butyl lactate was then recovered from the reaction mixture by a procedure similar to that used in Example 1, but omitting the washing step and distilling in vacuum after adding sodium acetate to the reaction mixture.

*Example 16*

A mixture of 360 g. of aqueous ammonium lactate (approximately 60 percent concentration), containing 2 moles of the lactate and 630 g. of ethylene glycol monoethylether was placed in a flask attached to a Vigreux column and heated slowly, under atmospheric pressure, to distill the water formed in the reaction. The temperature of the reaction mixture was gradually raised over a period of about 11 hours from 109° to 168° C., during which time the temperature of the vapors rose from 87° to 132° C. and 585 cc. of water and 1.61 moles of ammonia distilled over. The contents of the flask were then distilled in vacuum and 215 g. of the lactic acid ester of ethylene glycol monoethyl ether was collected at 82°–88° C./5 mm.

*Example 17*

The diethylamine salt of lactic acid was prepared by neutralizing 110 g. of approximately 80 percent aqueous lactic acid with 73 g. of the amine. The resulting solution was mixed with 185 g. of n-butyl alcohol and slowly distilled, at atmospheric pressure, in a Vigreux still. The temperature of the reaction mixture increased from 110° to 127° C. after 4 hours. Butyl lactate was recovered from the reaction mixture by distillation under reduced pressure.

*Example 18*

Ammonium glycolate was prepared by neutralizing 105 g. of 70 percent aqueous glycolic acid with concentrated aqueous ammonia. The resulting solution was mixed with 185 g. of n-butyl alcohol and 13.2 g. of ammonium sulfate, and treated as described in Example 1. After heating for 7 hours, the temperature of the reaction mixture rose from 112° to 129° C. and 0.5 mole of ammonia was liberated. Distillation of the reaction mixture in vacuum yielded 29 g. n-butyl glycolate boiling at 113°–114° C./60 mm.

*Example 19*

A mixture of 77 g. (1 mole) ammonium acetate, 50 cc. water and 74 g. (1 mole) of n-butyl alcohol was treated as described in Example 1. After heating for 8½ hours, the temperature of the reaction mixture gradually rose from 102° to 125° C., and 0.88 mole of ammonia had been liberated. Distillation of the contents of the flask gave 110 g. of n-butyl acetate.

*Example 20*

Ammonium benzoate was prepared by neutralizing a mixture of 122 g. (1 mole) benzoic acid and 300 cc. of water with an equivalent amount of concentrated aqueous ammonia. To the resulting solution were added 176 g. (2 moles) of n-amyl alcohol and 13.2 g. (0.1 mole) of ammonium sulfate, and the mixture was treated as described in Example 1. After heating for 14½ hours, the temperature of the reaction mixture gradually rose to 159° C.; 402 cc. of aqueous distillate was collected and 85 percent of the ammonia was liberated.

The contents of the flask were then washed with cold dilute sodium hydroxide solution until the wash showed an alkaline reaction. The organic layer was distilled, yielding 80 g. of amyl benzoate. Acidification of the aqueous wash liquor, followed by filtration of the resulting precipitate resulted in the recovery of 64 g. benzoic acid.

The esters of Examples 1–20 can also be obtained by analogous procedures, using equivalent amounts of mono-, di-, or trimethyl or of mono-, di-, or triethylamine or of di- or tributylamine, or of triamylamine or trioctylamine salts of the organic acids in place of the ammonium salts, and by conducting the esterification either in the presence or in the absence of ammonium sulfate.

Having thus described the invention, what is claimed is:

1. A process of producing an ester comprising reacting a basic nitrogen salt of an organic carboxylic acid, in which the nitrogen of the salt has a valence of 5, with an alcohol, to produce an ester of the organic carboxylic acid having an ester group corresponding to that of the alcohol.

2. The process of claim 1 in which formed water is continuously removed from the reaction mixture.

3. The process of claim 1 in which an excess of the alcohol is used and the formed water is continuously removed by azeotropically distilling it and the excess alcohol from the reaction mixture.

4. The process of claim 1 in which the reaction is conducted in the presence of a catalyst, an excess of the alcohol is used and the formed water is continuously removed by azeotropically distilling it and the excess alcohol from the reaction mixture.

5. The process of claim 4 in which the basic nitrogen salt of the carboxylic acid is an ammonium salt of an aliphatic carboxylic acid.

6. A process of producing a lactate comprising reacting ammonium lactate with an excess of an alcohol in the presence of a catalyst, and continuously removing formed water by azeotropically distilling it and the excess alcohol from the reaction mixture, to produce a lactate with its ester group corresponding to that of the alcohol.

EDWARD M. FILACHIONE.
CHARLES H. FISHER.

REFERENCES CITED

The following references are of record in the file of this patent:

UNITED STATES PATENTS

| Number | Name | Date |
| --- | --- | --- |
| 1,421,605 | Steffens | July 4, 1922 |
| 2,001,926 | Török | May 21, 1935 |
| 2,155,625 | Von Retze | Apr. 25, 1939 |
| 2,173,124 | Meyer et al. | Sept. 19, 1939 |
| 2,406,648 | Weisberg et al. | Aug. 27, 1946 |
| 2,434,300 | Weisberg et al. | Jan. 13, 1948 |

FOREIGN PATENTS

| Number | Country | Date |
| --- | --- | --- |
| 256,587 | Great Britain | Nov. 4, 1926 |